(12) United States Patent
Huber et al.

(10) Patent No.: US 7,300,511 B2
(45) Date of Patent: Nov. 27, 2007

(54) LOW VISCOSITY, HIGHLY PIGMENTED OIL BASED DISPERSIONS EXHIBITING A LOW RELATIVE INTERFACIAL TENSION DROP

(75) Inventors: Gregory T. Huber, Indian Springs, OH (US); Tatiana N. Romanova, Loveland, OH (US); Russell J. Schwartz, Cincinnati, OH (US); Lisa Clapp, Mason, OH (US); Terrance R. Chamberlain, Montgomery, OH (US); Don Henderson, Loveland, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/173,933

(22) Filed: Jul. 1, 2005

(65) Prior Publication Data

US 2007/0000408 A1  Jan. 4, 2007

(51) Int. Cl.
| | |
|---|---|
| C09B 67/02 | (2006.01) |
| C09B 48/00 | (2006.01) |
| C09B 63/00 | (2006.01) |
| C09C 1/48 | (2006.01) |
| C09D 11/00 | (2006.01) |
| C08K 5/00 | (2006.01) |

(52) U.S. Cl. .................. 106/476; 106/31.6; 106/31.75; 106/31.76; 106/31.77; 106/31.78; 106/31.79; 106/31.8; 106/31.81; 106/31.9; 106/402; 106/410; 106/411; 106/413; 106/493; 106/496; 106/497; 106/498; 106/499; 106/504

(58) Field of Classification Search ............... 106/31.6, 106/31.9, 410, 411, 413, 493, 496, 497, 498, 106/499, 31.75, 31.76, 31.77, 31.78, 31.79, 106/31.8, 31.81, 504, 402, 476
See application file for complete search history.

(56) References Cited

U.S. PATENT DOCUMENTS

| | | | | |
|---|---|---|---|---|
| 4,484,952 A | * | 11/1984 | Bes et al. .................. | 106/504 |
| 4,859,247 A | * | 8/1989 | Foye et al. .................. | 106/505 |
| 5,037,564 A | * | 8/1991 | Nishizaki et al. ........... | 508/450 |
| 6,530,989 B1 | * | 3/2003 | Anantharaman et al. .... | 106/493 |
| 2005/0157323 A1 | * | 7/2005 | Narusawa et al. .......... | 358/1.13 |
| 2006/0070550 A1 | * | 4/2006 | Ortalano et al. ............ | 106/245 |

* cited by examiner

*Primary Examiner*—Anthony J. Green
(74) *Attorney, Agent, or Firm*—Kramer Levin Naftalis & Frankel LLP

(57) ABSTRACT

Pigment dispersions that when used in printing ink having a relative interfacial tension drop of less than 1.5, and offering an ink viscosity of less than 150 Pa.s, and containing at least 45 wt. % pigment.

6 Claims, 3 Drawing Sheets

LOW VISCOSITY, HIGHLY PIGMENTED OIL BASED DISPERSIONS EXHIBITING A LOW RELATIVE INTERFACIAL TENSION DROP

FIELD OF THE INVENTION

The invention relates to low viscosity, highly pigmented, oil based dispersions that exhibit a low relative interfacial tension drop.

BACKGROUND OF THE INVENTION

Dispersions with high pigment content provide a number of advantages to the printing ink manufacturer such as greater formulating latitude that permits the production of a greater variety of inks, cost reductions and lower inventory volumes.

The upper limit for the pigment concentration in a dispersion is determined by the resulting viscosity of the dispersion. As the pigment concentration increases linearly, the viscosity of the dispersion increases exponentially. However, if the viscosity becomes too high, the pigment concentrate can no longer be dispersed satisfactorily or easily handled during the ink manufacturing process. In addition, as the pigment concentration and resultant viscosity increases, the ink system experiences increasing heat build up due to frictional forces that occur during the dispersion process. This can be detrimental to the quality of ink as the increase in temperature may cause the degradation of certain pigments. Additionally, without proper control, lithography printing problems such as over-emulsification can occur, which is when the ink takes up excessive fountain solution causing poor ink transfer, blanket piling, high dot gain, misting; scumming, which is the inability of a fountain solution to keep the non-image area of a printing plate clean and is not easily washed from the plate; and feedback, which is the contamination of a fountain solution during the printing process that results in poor final print quality.

U.S. Pat. Nos. 4,859,247, 4,224,212, 4,057,436 and 3,996,059 describe oil-soluble viscosity reducing salts or cationic dispersant additive materials. Incorporation of these additives produces an increase in pigment concentration. However, their associated "surfactant-like" properties create a low interfacial tension and a very large a relative interfacial tension drop in oil-water ink systems which can result in lithographic printing problems (e.g. over-emulsification, scumming, or feedback). U.S. Pat. No. 6,290,768 discloses a pigment concentrate made up of pigment reacted with large amounts of natural resins or natural resin acids, monocyclic or polycyclic phenols, and small amounts of aldehydes or aldehyde acetals, Ia and IIa group metal compounds, and alpha, beta-ethylenically unsaturated carboxylic acids or their anhydrides. While the pigment dispersion prepared from such concentrate has good flow, it has high viscosity which can create ease of handling problems.

U.S. Pat. No. 5,935,315 discloses low viscosity aqueous pigment dispersions that are free of organic solvent and contain a fatty amidoalkoxylate dispersant. U.S. Pat. No. 5,882,393 discloses a dispersing agent or a salt of polyisocyanates reacted with a heterocyclic ring and a $C_2$-$C_5$ acrylate or epoxide moieties. Dispersants containing such salts exhibit poor lithographic printing performance. U.S. Pat. No. 5,645,636 discloses a pigment concentrated base and a dispersant of arylpararosanillnesulfonic acids derived from the condensation of an aliphatic amine or an ammonium compound and a polyester of hydroxyl fatty acid.

U.S. Pat. No. 5,688,312 discloses a hot melt ink composition containing polymeric imides or bisimides made by reacting a $C_2$-$C_{30}$ polyalkyleneoxide with a derivative of a phthalic anhydride or a succinic anhydride.

U.S. Pat. No. 5,336,314 and WO 02/34840 A1 describe dispersants, however neither of these dispersing vehicles can be used in a conventional flush systems employed to displace the dispersion vehicle of a pigment dispersion with another vehicle. U.S. Pat. No. 5,336,314 discloses reacting phthalic anhydride with a polyester polymer. WO 02/34840 A1 discloses a phthalic acid imide with a $C_{30}$ maximum chain polyalkyl length for use in water-based systems. U.S. Pat. No. 5,429,841 discloses an ink containing a polyoxyalkylene substituted colorant.

U.S. Pat. No. 4,859,247 discloses an oil soluble viscosity reducing additive made by combining a long chain aliphatic amine and a polybasic organic acid in the form of salt. Incorporation of the additive allows increase pigment concentration in dispersions of up to 65 wt. %, but create significant problems in lithography printing such as scumming and feedback. U.S. Pat. No. 4,765,841 describes the preparation of organic pigment dispersions in non-aqueous medium directly from an aqueous slurry of the pigment. Dispersants are selected from resins, alkyds and mixed amide/salt-derivatives of polyesters derived from a hydroxycarboxylic acid. These dispersants can cause a substantial decrease in interfacial tension of an ink and the aforementioned scumming, feedback and over emulsification problems.

U.S. Pat. No. 4,468,255 discloses diazo and azo linkage Schiff's bases reacted with polyoxyalkane polymeric chains used as a rheological modifier for pigment dispersions. U.S. Pat. No. 4,461,647 discloses a non-aqueous pigment dispersant made of a diazo compound containing a single substituted ammonium-acid salt group. In general, salts create significant problems in lithography printing such as scumming and feedback.

U.S. Pat. No. 4,391,648 discloses a solid particulate granular pigment composition readily dispersible in an oleoresinous vehicle system made from a pigment, a cationic surfactant or blend of surfactants, and a water-soluble, non-crystalline, friable, thermoplastic polyester resin. Surfactants are placed in the dispersion which can cause scumming and feedback problems.

U.S. Pat. Nos. 4,340,431 and 4,309,320 describe the preparation of an organic pigment dispersion in a non-aqueous medium produced from an aqueous pigment slurry by incorporating an additive selected from sulfonated and sulfonated sperm oil.

However, the pigment loading is as low as 10 wt. %. U.S. Pat. No. 4,047,436 discloses a pigment dispersion using a quatemary ammonium salt of a monomeric colored acid. Quatemary ammonium compounds tend to cause the aforementioned lithographic printing problems and produce a low interfacial tension.

U.S. Pat. No. 4,028,128 describes a pigment dispersion containing a carboxy ester and pigment in organic liquids useful for paints, lacquers and gravure inks. However, the pigment concentrations are low. U.S. Pat. No. 3,966,059 discloses a pigment dispersion and a dispersion agent. These dispersions greatly suppress interfacial tension and can result in poor lithographic printing performance.

As indicated hereinabove, where the prior art discloses pigment dispersions having more than 45 wt. % pigment and viscosities of less than 150 Pa.s, said dispersions cause printing problems (e.g. over-emulsification, scumming, or feedback) in lithography printing. Offset inks are said to be over emulsified when excessive fountain solution emulsification causes poor ink transfer, blanket piling, high dot gain, and misting.

Surprisingly it has been found that careful control of interfacial tension, notably, maintaining a low-relative interfacial tension drop at the oil-water interface greatly helps to avoid known lithographic printing problems such as over-emulsification, scumming, and tinting.

Thus, there exists a need for high pigment load dispersions useful for formulating printing ink having low viscosity and low relative interfacial tension drop at the oil-water interface required for good lithographic printing performance and offering substantially reduced tendency toward scumming, feedback and over-emulsification.

SUMMARY OF THE INVENTION

The above objectives can be realized by employing a pigment dispersion composition comprising at least about 45 wt. % pigment and exhibiting a relative interfacial tension drop of less than about 1.5 and a viscosity of less than about 150 Pa.s.

Other objects and advantages of the present invention will become apparent from the following description and appended claims.

DETAILED DESCRIPTION OF THE INVENTION

Figure 1:
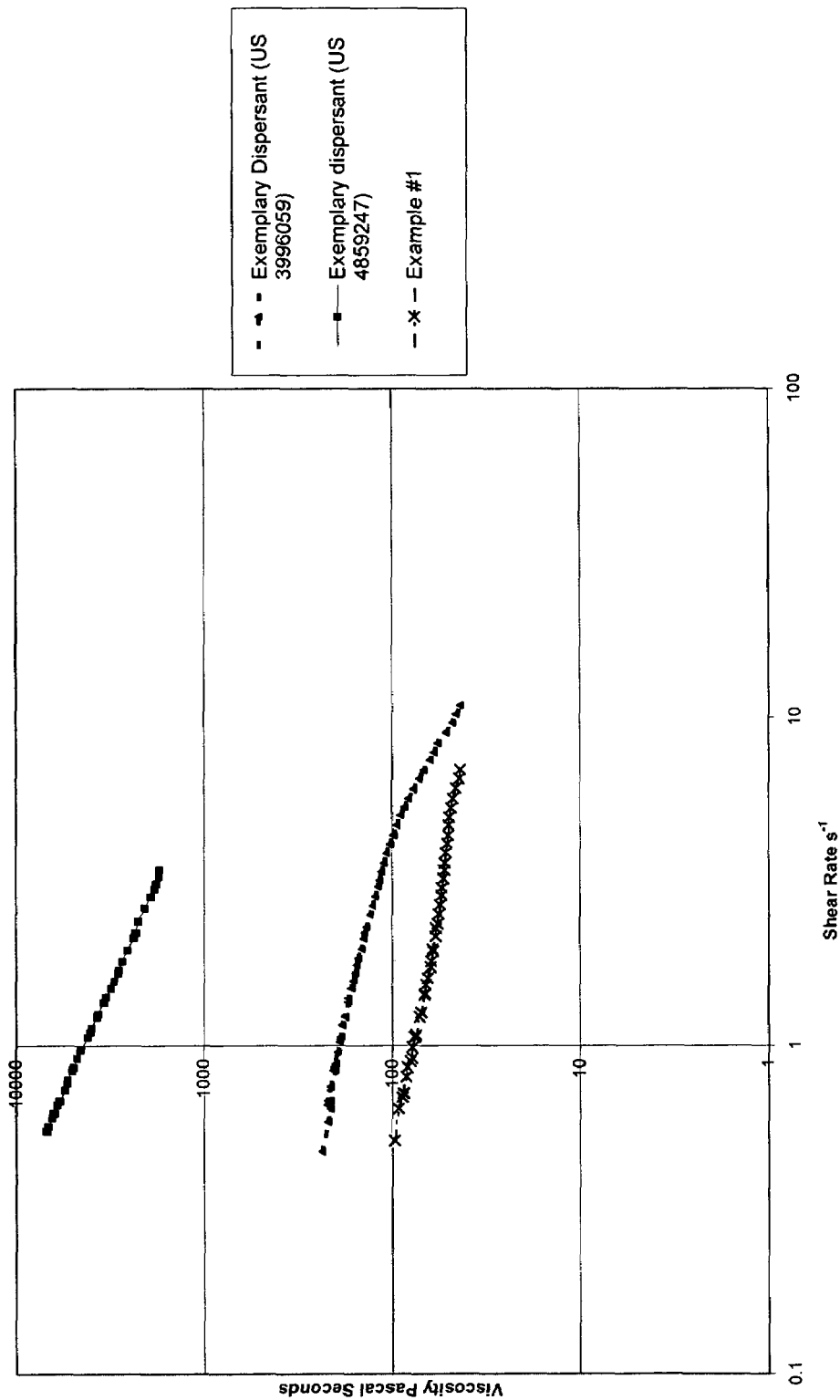
FIG. 1 shows the relationship between viscosities at different shear rates of oil-based dispersions having 50% pigment Red 57:1 with different dispersants.

In accordance with the present invention, it has been surprisingly discovered that highly concentrated pigment dispersions can be prepared which have low viscosity if the a relative interfacial tension drop is controlled. These dispersions can be sued to produce inks of improved lithographic printing performance.

The pigment dispersion of the present invention has a relative interfacial tension drop of less than about 1.5 and a viscosity of less than about 150 Pa.s.

The pigment dispersion may be comprised of between about 40 wt. % to about 90 wt. %, based on the total weight of the dispersion, of an organic pigment or carbon black, and preferably between about 45 wt. % to about 65 wt. %. Suitable pigments include, but are not limited to mono and diazo pigments, phthalocyanine pigments, quinacridone pigments, rhodamine dyes and pigments, perylene pigments, diketoprryoles pigments, anthraquinone dyes and pigments, indanthrene dyes, laked pigments, dioxazine pigments, isoindolinone pigments, and dioxazine pigments. It is preferred that the pigment be a red, yellow or blue organic pigment, including but not limited to Carbon Black, Pigment Yellow 12, Pigment Yellow 13, Pigment Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Pigment Blue 15:4, Pigment Red 49, Pigment Red 49:1, Pigment Red 49:2, Pigment Red 50:1, Pigment Red 51, Pigment Red 53, Pigment Red 53:1, Pigment Red 53:3, Pigment Red 68, Pigment Orange 16, Pigment Orange 17:1, Pigment Orange 46, Red 48:1, Pigment Red 48:2, Pigment Red 48:3, Pigment Red 48:4, Pigment Red 48:5, Pigment Red 52:1, Pigment Red 52:2, Pigment Red 57:1, Pigment Red 58:2, Pigment Red 58:4, Pigment Red 63:1, Pigment Red 63:2, Pigment Red 64, Pigment Red 64:1, Pigment Red 200, Pigment Brown 5, Pigment Red 151, Pigment Red 237, Pigment Red 239, Pigment Red 240, Pigment Red 243, Pigment Red 247, Pigment Yellow 104, Pigment Orange 19, Pigment Red 60, Pigment Red 66, and Pigment Red 67.

The relative interfacial tension drop ("RIFTD") may be controlled though a number of components in the pigment dispersion. For example, by employing a dispersant which maintains a relative low interfacial tension drop while maintaining the viscosity of the pigment dispersion to less than 150 Pa.s.

If a dispersant is employed as a means for controlling RIFTD, then such dispersant may include, but is not limited to grafted dispersants, polymeric grafted dispersants having at least one anchoring groups, star polymers, dendrimer polymers, bifunctional polymers and combinations thereof.

Further, in order to maintain a low RIFTD of less than 1.5 and a viscosity of less than 150 Pa.s, pigment dispersions made of specially encapsulated pigments are preferred. In addition, the pigment surface (i.e., grafting) maybe surface modified, for example, by attaching a chemical polymer to the pigment.

The pigment dispersions of the present invention are further illustrated by the following non-limiting examples in which all parts and percentages are by weight, unless otherwise indicated.

EXAMPLE 1

Polyisobutylamine (200 parts, FD-100, available from BASF, Wyandotte, Mich.) and 1,2,4-benzenetricarboxylic anhydride (12.39 parts, available from Aldrich Chemicals of Milwaukee, Wis.) was stirred under vacuum and nitrogen purge at 120° C. for 2 hours while the solid reactant slowly melted. The temperature was then raised to 160° until the oil from the polyisobutylamine was removed and the reaction product was cooled to room temperature producing a honey brown liquid having the following properties: Brookfield viscosity of 116200 cps at 3 R.P.M. (#4 spindle, 19° C.), amine number value of 0, and acid number value of 21.85.

EXAMPLE 2

Polyisobutylamine (200 grams, FD-100, available from BASF, Wyandotte, Mich.), from which the oil was removed, 2-chlorotoluene (200 grams, available from Aldrich Chemicals of Milwaukee, Wis.), and Pigment Yellow 12 (26.5 grams, available from Sun Chemical Corporation, Ft. Lee, N.J.) was stirred under vacuum and nitrogen purge at 180° C. at reflux for 24 hours. The 2-chlorotoluene was removed and the reaction product was cooled to room temperature producing a very dark red viscous liquid.

EXAMPLE 3

3-Hydroxy-4-(2,5-dichlorophenylazo)naphthalene-2-carboxylic acid (43 grams) and 2-chlorotoluene (238 grams) were added under stirring and nitrogen purge. After purging with nitrogen for 10 minutes, hionyl chloride (20 grams) and dimethylformamide (1.5 grams) were added. The reaction mixture was heated to 90° C. over 3 hours and then maintained at this temperature for one additional hour. Polyisobutylamine (385 grams; FD-100, available from BASF, Wyandotte, Mich.) was added and a vacuum applied to the mixture while stirring at 90° C. for 3 hours. The mixture temperature was raised to 120° C. and maintained for an additional 5 hours. On subsequent cooling to room temperature, the reaction product obtained was a viscous dark red liquid.

EXAMPLE 4

2-(4-carboxyphenylazo)acetoacetanilide (43 grams) and 2-chlorotoluene (238 grams) were added under stirring and nitrogen purge. After purging with nitrogen for 10 minutes, hionyl chloride (20 grams) and dimethylformamide (1.5 grams) were added. The reaction mixture was heated to 90° C. over 3 hours and then maintained at this temperature for one additional hour. Polyisobutylamine (385 grams; FD-100, available from BASF, Wyandotte, Mich.) was added and a vacuum applied to the mixture while stirring at 90° C. for 3 hours. At this stage the mixture temperature was raised to 120° C. and maintained for an additional 5 hours. On subsequent cooling to room temperature, the reaction product obtained was a viscous yellow liquid.

EXAMPLE 5

Copper phthalocyanine sulfonyl chloride (100 grams; 38.24% in water) and polyisobutylamine (113 grams; FD-100, available from BASF, Wyandotte, Mich.) were mixed thoroughly for ten minutes to which sodium carbonate (15 grams) was added and stirred for 3 hours. The mixture heated at 90-120° C. under vacuum for 3 hours to remove water. The reaction product was cooled producing a very viscous blue liquid.

EXAMPLE 6

Ten different pigment dispersion compositions containing different types of pigments and dispersants were prepared and their rheological properties were tested. Each pigment dispersion composition was prepared in the following manner: 25 parts of a varnish (16.75 parts of a hydrocarbon resin (LX 1082-280; available from Neville Chemical of Pittsburgh, Pa.) and 8.25 parts of 47 oil (available from Magie Bros., Franklin Park, Ill.)), 20 parts of 47 Oil (available from Magie Bros., Franklin Park, Ill.), 50 parts of pigment, and 5 parts dispersant (if present) were combined together and mixed on a Hoover Muller Mixer at 3×50 revolutions. The viscosities of the resulting pigment dispersions were measured along with their effect on the relative interfacial tension of an oil-water ink system.

Viscosity Measurements

Rheological measurements were carried out using the following instruments and under the following conditions:

Rheometer: Haake RS100 controlled stress rheometer with cone and plate geometry.

Measuring Geometry: Haake PP35H, parallel plate with a diameter of 35 mm.

Temperature Control: Haake TC-501 electrical heater with temperature control to both cone and plate.

Measurement mode: linear sweep from $10\ S^{-1}$ to $100\ S^{-1}$ in 600 S.

Measurement temperature: 25° C. (both cone and plate temperatures are controlled).

Each pasty pigment concentrate samples was loaded on the lower stationary plate with a spatula. All samples were of virgin materials and no pre-shearing was done to the sample to emulate the actual bulking process. The lower stationary plate was then raised slowly to compress the sample against the upper plate (the cone) to reach the present measurement position. The gap width was set to be 1 mm in all cases. Both upper plate and the lower plate were pre-equilibrated to 25° C. before starting the measurement. The temperature tolerance was set to be 1° C. The sample was subjected to a linear stress sweep with a shear rate ranging from $10^{-1}$ to $100\ S^{-1}$. For a more viscous sample, the experiment might be terminated before reaching $100\ S^{-1}$ to avoid torque overloading of the machine. The data collection mode was logarithmic to emphasize the lower shear rate range, which is of primary interest of this patent. Both shear stress and shear rate data were collected to deduce viscosity information.

Interfacial Tension Measurements

To measure the interfacial tension, glass jars (2 ounces) were used to prepare the sample dispersion. The glass jar was tared on a balance and 50 grams of stainless steel shot was added. The balance was again tared and 32.3 grams of Magiesol was added with the 1 gram sample concentrates. The jar was placed on a Harbil shaker for 15 minutes to disperse the sample concentrates in the oil. The shot was strained from the dispersion. The Tracker pendent drop tensiometer was calibrated with a ball bearing of known diameter, which was provided by the instrument manufacturer. A glass cuvette and a previously calibrated syringe were cleaned with an industrial detergent followed by copious washing with deionized water. The washing was finished followed by a 10 minute ultrasonic bath cleaning in the presence of deionized water. The sample dispersion was loaded into the cleaned syringe and the syringe with an inverted needle is placed into the Tracker instrument. The Tracker instrument was then instructed to measure the interfacial tension of the sample dispersion versus a citric acid buffer continuous phase at pH=3.1 for 600 seconds.

The relative interfacial tension drop (RIFTD) was calculated from the following equation:

$$RIFTD = \frac{\gamma_i - \gamma_f}{\gamma_f}$$

where $\gamma_i$ is the initial interfacial tension measured at a surface age of $\frac{1}{25}^{th}$ of a second and $\gamma_f$ is the final interfacial tension measured at a surface age of 600 seconds. From an extensive database the RIFTD should be less than 1.5.

Measurement Results

Figure 2:
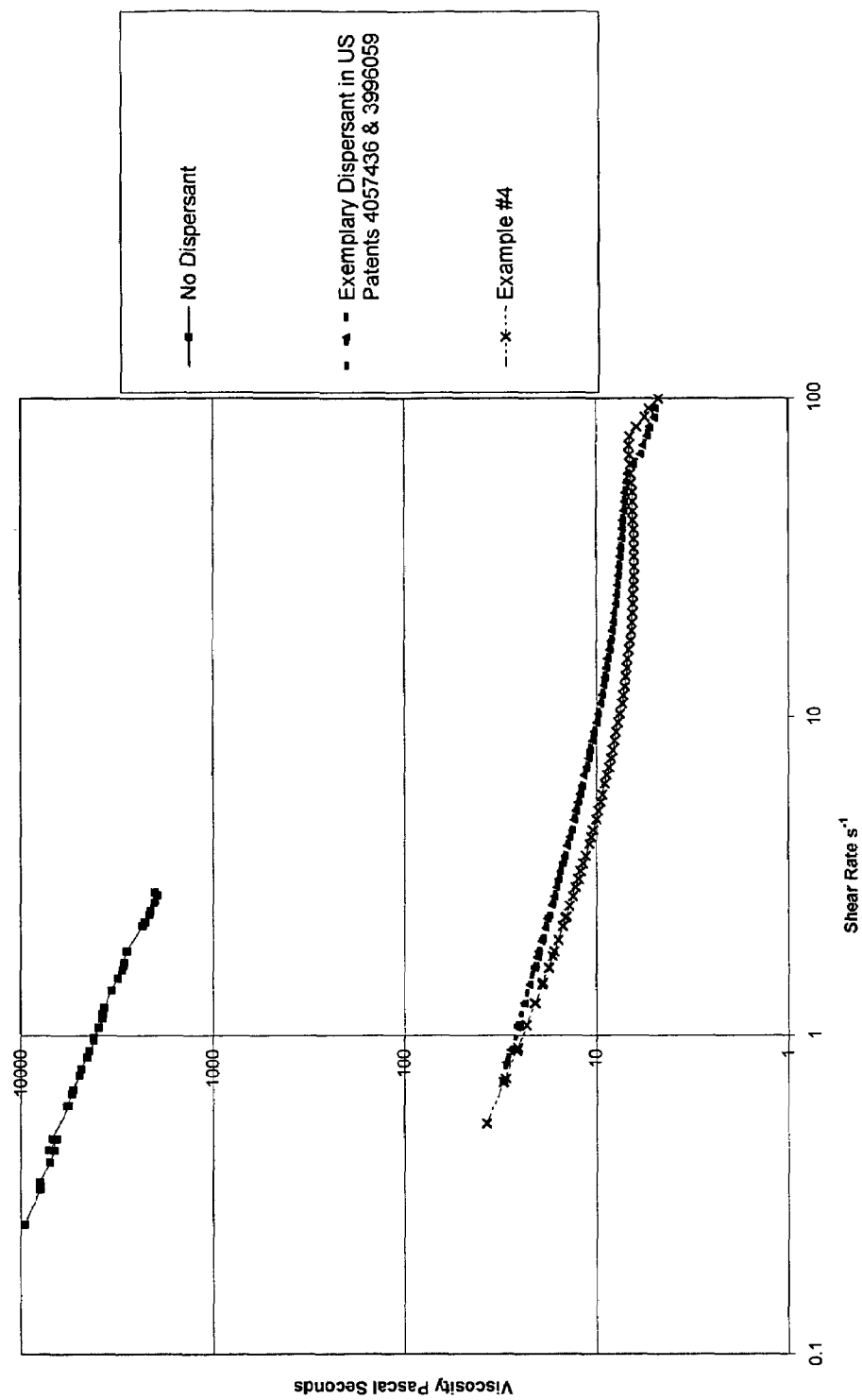
FIG. 2 shows the relationship between viscosities at different shear rates of oil-based dispersions having 50% pigment Yellow 12 with and without dispersants.
Figure 3:
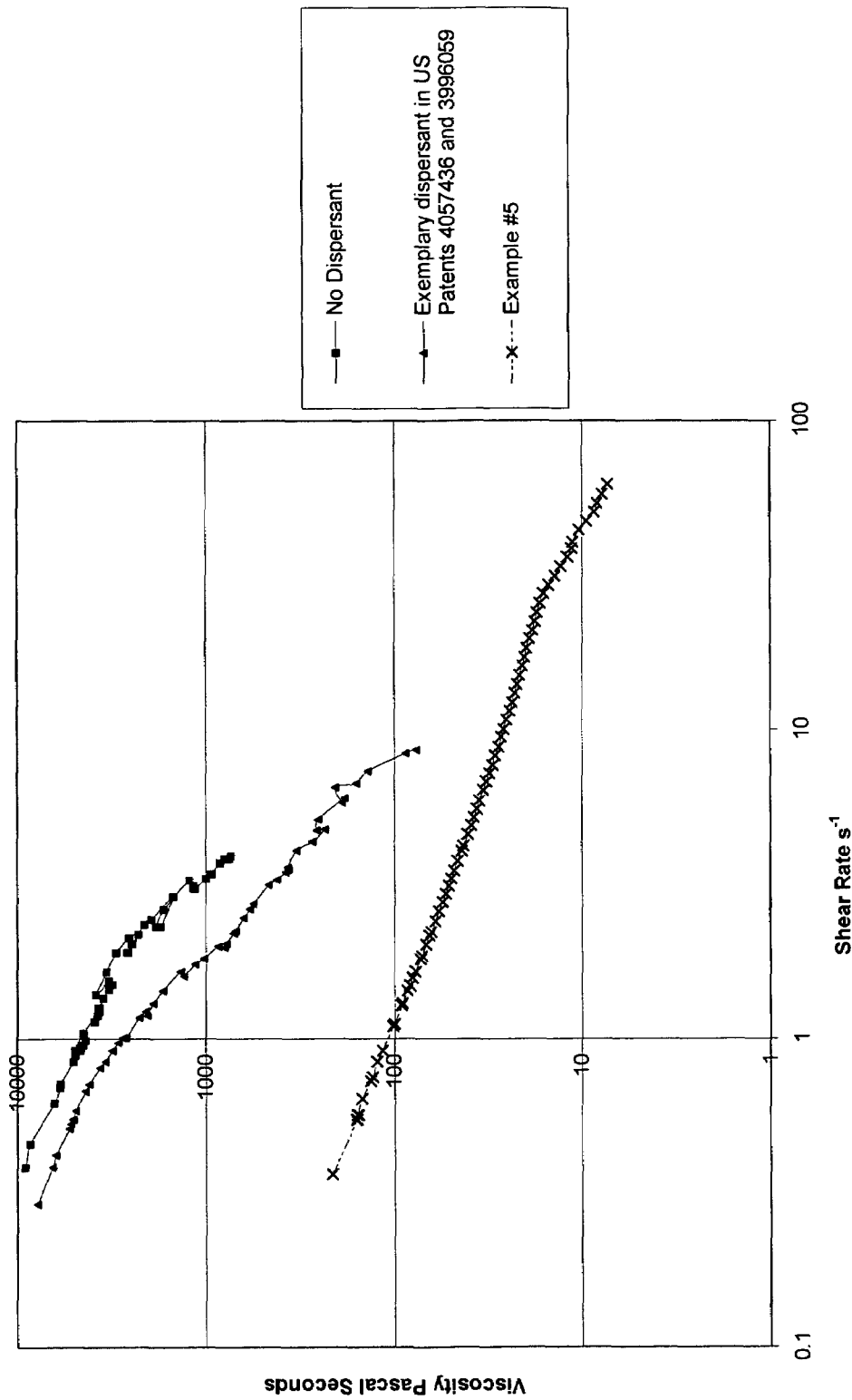
FIG. 3 shows the relationship between viscosities at different shear rates of oil-based dispersions having 50% pigment Blue 15:3 with and without dispersants.

Table 1 and FIGS. 1-3 show the results of the rheological testing and interfacial tension measurements in numerical and graphical display. The results indicate that the pigment dispersion compositions containing the dispersants of the present invention have significantly lower relative interfacial tension drop than pigment dispersion compositions containing no dispersant or dispersants known in the prior art. Further, the pigment dispersion composition containing the present invention dispersant has lower viscosity than that of either the pigment dispersion containing no dispersant, or dispersants known in the prior art as shown in FIGS. 1-3 where viscosities of oil-based dispersions were measured at different shear rates using Haake RS100 controlled stress rheometer with cone and plate geometry.

Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Pigment Blue 15:4, Pigment Red 49, Pigment Red 49:1, Pigment Red 49:2, Pigment Red 50:1, Pigment Red 51, Pigment Red 53,

TABLE 1

| Dispersant | Pigment | Pig. % | Varnish % | Synergist % | Dispersant % | Oil % | RIFTD | Viscosity (Average Pa·s @ 1/s) |
|---|---|---|---|---|---|---|---|---|
| — | Red 57:1 | 50 | 25 | 0 | 0 | 25 | 0.09 | >8000 |
| Comparative Example (U.S. Pat. No. 3996059) | Red 57:1 | 50 | 25 | 0 | 5[3] | 20 | >3.0 | 175 |
| Comparative Example U.S. Pat. No. 4859247 (Example 1) | Red 57:1 | 50 | 25 | 0 | 5 | 20 | >3.0 | 3780 |
| Example 1 | Red 57:1 | 50 | 25 | 0 | 5 | 20 | 0.63 | 80 |
| Exemplary dispersant in U.S. Pat. Nos. 4057436 & 3996059 | Yellow 12 | 50 | 25 | 2.5[1] | 2.5[3] | 20 | 1.93 | 23 |
| — | Yellow 12 | 50 | 25 | 0 | 0 | 25 | 0.41 | >8000 |
| Example 4 | Yellow 12 | 50 | 25 | 0 | 5 | 20 | 1.18 | 23 |
| — | Blue 15:3 | 50 | 25 | 0 | 0 | 25 | 0.24 | 4300 |
| Exemplary dispersant in U.S. Pat. Nos. 4057436 & 3996059 | Blue 15:3 | 50 | 25 | 2.5[2] | 2.5[3] | 20 | 0.73 | 2816 |
| Example 5 | Blue 15:3 | 50 | 25 | 0 | 5 | 20 | 0.18 | 104 |

[1]Solsperse 22000, a synergist available from Avencia, of Charlotte, NC.
[2]Solsperse 5000, a synergist available from Avencia, of Charlotte, NC.
[3]Solsperse 17000, a dispersant available from Avencia, of Charlotte, NC.

The invention has been described in terms of preferred embodiments thereof, but is more broadly applicable as will be understood by those skilled in the art. The scope of the invention is only limited by the following claims.

What is claimed is:

1. An oil based pigment dispersion comprising at least about 45 wt. % of pigment, wherein said pigment is selected from the group consisting of organic pigments and carbon black, said dispersion having a relative interfacial tension drop of less than about 1.5 and a viscosity of less than about 150 Pa.s.

2. The pigment dispersion of claim 1, wherein the organic pigment is selected from the group consisting of mono and diazo pigments, phthalocyanine pigments, quinacridone pigments, rhodamine dyes and pigments, perylene pigments, diketoprryoles pigments, anthraquinone dyes and pigments, indanthrene dyes, laked pigments, dioxazine pigments, isoindolinone pigments, and dioxazine pigments.

3. The pigment dispersion of claim 1, wherein said pigment is selected from the group consisting of Carbon Black, Pigment Yellow 12, Pigment Yellow 13, Pigment Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Pigment Blue 15:4, Pigment Red 49, Pigment Red 49:1, Pigment Red 49:2, Pigment Red 50:1, Pigment Red 51, Pigment Red 53, Pigment Red 53:1, Pigment Red 53:3, Pigment Red 68, Pigment Orange 16, Pigment Orange 17:1, Pigment Orange 46, Red 48:1, Pigment Red 48:2, Pigment Red 48:3, Pigment Red 48:4, Pigment Red 48:5, Pigment Red 52:1, Pigment Red 52:2, Pigment Red 57:1, Pigment Red 58:2, Pigment Red 58:4, Pigment Red 63:1, Pigment Red 63:2, Pigment Red 64, Pigment Red 64:1, Pigment Red 200, Pigment Brown 5, Pigment Red 151, Pigment Red 237, Pigment Red 239, Pigment Red 240, Pigment Red 243, Pigment Red 247, Pigment Yellow 104, Pigment Orange 19, Pigment Red 60, Pigment Red 66, and Pigment Red 67.

4. The pigment dispersion of claim 3 comprising 45 wt. % of pigment.

5. A printing ink composition comprising the pigment dispersion of claim 1.

6. A printing ink composition of claim 5 wherein the printing ink is selected from lithographic and gravure printing inks.

* * * * *